N. I. SPRIGGS.
APPARATUS FOR REPAIRING INDIA RUBBER GOODS.
APPLICATION FILED NOV. 16, 1912.
1,118,596.
Patented Nov. 24, 1914.
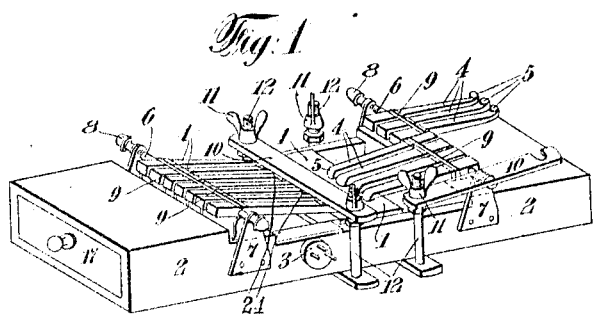
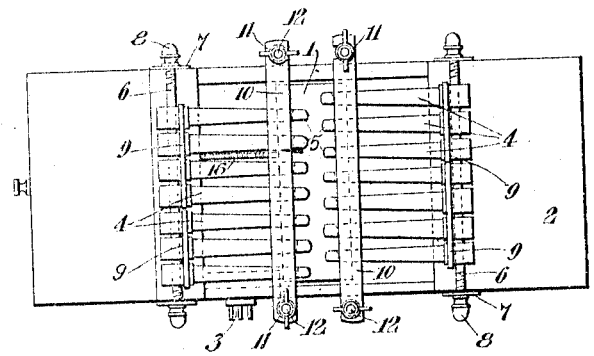
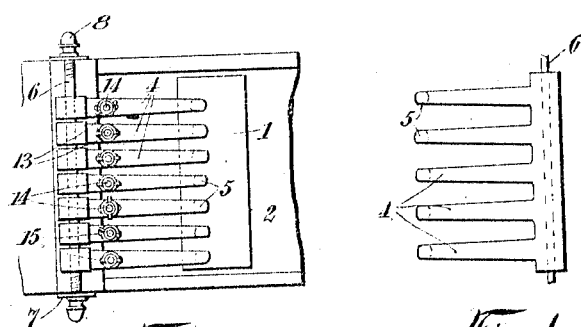
Witnesses:
John E. Prager
A. Worden Gibbs
Neville Ivans Spriggs Inventor
By his Attorney

UNITED STATES PATENT OFFICE.

NEVILLE IVENS SPRIGGS, OF LEICESTER, ENGLAND.

APPARATUS FOR REPAIRING INDIA-RUBBER GOODS.

1,118,596. Specification of Letters Patent. Patented Nov. 24, 1914.

Application filed November 16, 1912. Serial No. 731,769.

*To all whom it may concern:*

Be it known that I, NEVILLE IVENS SPRIGGS, a subject of the King of England, and a resident of Leicester, England, have invented certain new and useful Improvements in or Relating to Apparatus for Repairing India-Rubber Goods, of which the following is a specification.

This invention relates to an apparatus for repairing india rubber goods, being specially, though not exclusively, applicable for mending or stopping holes or fractures which may have occurred in rubber gloves.

The invention consists of a portable electrically heated vulcanizing apparatus, comprising a heater or metal bar mounted upon a wooden or other non-metallic base plate and arranged to be coupled up to a wire or wires leading from any suitable source of electrical current or energy. Coöperating with the said heater are one or more bars or trees upon or over which the fractured finger or thumb of a glove may be drawn prior to being repaired. The said trees are hinged or pivoted at one end to permit of being moved up or down for the purpose of placing thereon or removing therefrom the glove before and after repair, and also to allow the tree to be moved relatively to the heater. The trees may be individually movable relatively to the heater or a plurality of them may be movable in company.

Means are provided to lock the trees in position with their ends on the heater. These means may lock the trees individually or it may be arranged that a number of the trees may be fastened by a common locking means.

Provision may be made for the removal of the trees so that trees of different sizes or shapes may be used when required.

In further describing the invention and the manner of using the apparatus reference will be made to the accompanying drawing, wherein:—

Figure 1 is a perspective view of an apparatus which constitutes one embodiment of this invention. Fig. 2 is a plan of the same. Fig. 3 is a plan showing a modification of the means employed for fastening or locking the trees. Fig. 4 is a plan of a modified arrangement of the trees.

Like parts are designated by the same reference characters in all the figures of the drawing.

A vulcanizing apparatus according to this invention comprises a heater 1 consisting of a metal bar or bed adapted to be heated electrically in any known manner said heater being mounted upon a wooden or other non-metallic base plate 2. The base 2 may be provided with a suitable coupling or plug 3 to which connection may be made from any convenient source of electrical current to supply the heater 1.

The article to be repaired is pressed upon the heater 1 by a tree and although the invention is intended to cover apparatus having only one tree, nevertheless it is preferable that a plurality of trees be provided. The said trees 4 are movably carried on the base plate 2 and consist of fingerlike bars composed of wood or some other material which is a good non-conductor of heat. It may, however, be found advantageous to form the trees partly of metal the tips or ends which make contact with the heater being made of wood or other non-conducting material. The trees 4 are hinged or pivoted so that they may be turned or moved to and from the heater as shown in Fig. 1, thus permitting the goods to be readily placed on and removed from the trees.

The locality wherein fractures most commonly occur in rubber gloves is at the ends of the fingers, hence the end of each tree 4 may be formed with a flattened extension or continuation 5. When the fractured finger of the glove is drawn upon the tree, the fracture or hole is located on the flattened portion 5 and then when the tree is brought down into position on the heater 1 the fractured part of the glove is pressed into close contact with the surface of the heater, as hereinafter described.

Conveniently the trees 4 may be movably mounted at one end upon a rod 6 or equivalent, said rod being carried by brackets or plates 7 attached to the base plate 2. The rod 6 may be withdrawable from the brackets to permit the removal, renewal or exchange of the trees. The rod may be kept in place in the brackets 7 by knobs 8 or equivalents, which screw or otherwise fit upon the rod ends.

The trees 4 may be independently movable on the rod 6 as shown in Figs. 1, 2 and 3 this construction enabling any one tree to be turned back and separated from the others whereby the placing of the glove finger upon the tree is facilitated. It may however be desired that in order to save time in turning the trees over, a number of them, say three or four, or more or less, shall be movable in company and yet be capable of being separated and turned individually if needs be. To this end, an elastic band 9 or a spring or equivalent may be located around or passed through those trees it is desired to couple together in the manner mentioned. In Figs. 1 and 2, sets of three and four trees are connected by bands 9 which latter yieldingly connect the trees in each set so that they may be operated in the manner just mentioned.

In Fig. 4 is shown a modification wherein a plurality of trees are integrally connected in which case they are all movable together and no individual movement of the trees is provided.

Instead of the foregoing arrangements, a complete hand tree (not shown) may be employed with the fingers and thumb trees separately hinged or movable up and down relatively to the heater 1 for the purpose hereinbefore mentioned.

For locking the trees 4 and applying pressure thereto when they are in the operative position, i. e. turned down upon the heater 1, means such as shown in Figs. 1 and 2 may be provided said means consisting of a bar 10 adapted to extend across the trees and be tightened by wing nuts 11 on bolts or screwed rods 12. The screwed rods 12 are suitably attached to the base plate 2 and the bar 10 may be turnable on one of the rods as a pivot so that it can be brought into and out of position over the trees as shown in Fig. 1. Suitable springs 24 secured to the underside of the bar 10 serve to maintain the desired pressure upon the trees.

In the arrangement of locking means just described the bar 10 operates simultaneously upon a plurality of trees but in a modified arrangement the trees may each be locked in the working position by independent means consisting, as shown in Fig. 3, of a wing nut 13 on a stud or screwed rod 14 the latter passing through a slot 15 in the tree. The studs 14 are fixed in the base plate 2 and when the trees 4 are brought down to the working position the ends of the studs project through the slots 15 and then the nuts may be applied and tightened down upon the trees. Either of the aforesaid types of locking means may be employed with the arrangement of trees shown in Fig. 4 but preferably the bar form is used.

A thermometer 16 (Fig. 2) is combined with the heater 1 so as to indicate the degree to which the heater is heated.

In practice the glove finger is drawn over the tree 4 so that the fractured part is as before stated at the extreme and flattened end 5 thereof upon which it is stretched or flattened out. A small wad or piece of raw rubber is then placed on or over the fracture with or without the previous application thereto of a suitable substance to act as a flux and the tree is lowered on to the heater 1 and locked thereon, the locking means being tightened so as to cause the tree to press on the heater, in which position it remains until the heat effects the fusion and union of the wad and the glove and the repair of the fracture is complete.

The base plate 2 has a drawer 17 for containing spare trees and other items for use in connection with the apparatus.

In the form of apparatus illustrated in Figs. 1 and 2 two separate sets of trees are arranged to coöperate with the same heater each set of trees having a separate locking device.

It is to be understood that the invention is not to be limited to any particular number of trees or sets of trees which may be arranged to coöperate with the same heater. When the locking means consist of a bar such as 10 it will be obvious that any or all of the trees in the set with which said bar is employed may be used at one time, those which are not required may be left turned back i. e. in the non-working position.

Vulcanizing apparatus for attaching rubber soles to boots, etc., has been proposed consisting of a steam heated chamber coöperating with which has been a last or work support movable relatively to the heater by a rack and pinion or by a piston. I do not however wish to claim any such construction.

Having now particularly described and ascertained the nature of my said invention and in what manner the same is to be performed, I declare that what I claim is:—

1. An apparatus for repairing india rubber goods by the process of vulcanization, comprising a suitable heater and a plate heated thereby, trees movable with respect to said plates and over which the article or articles to be repaired are adapted to be drawn, a bar extending over said trees, and suitable means adapted to engage the said bar to tighten the same down upon the said trees to lock the latter in working position with their ends in contact with the said plate.

2. An apparatus for repairing india rubber goods by the process of vulcanization, comprising a suitable heater and a plate heated thereby, trees movable with respect to said plates and over which the article or articles to be repaired are adapted to be drawn, a bar extending over said trees, resilient means beneath said bar to maintain a suitable pressure upon said trees, and suitable means adapted to engage the said bar to tighten the same down upon the said trees to lock the latter in working position with their ends in contact with the said plate.

Signed at Leicester in the county of Leicester England this 5th day of November A. D. 1912.

NEVILLE IVENS SPRIGGS.

Witnesses:
WALTER W. BALL,
F. HOOD.